United States Patent [19]

Aubert

[11] 4,279,268
[45] Jul. 21, 1981

[54] MULTI-LEVEL PRESSURE REGULATING VALVE

[75] Inventor: Paul Aubert, Clamart, France

[73] Assignee: Regie Nationale des Usines Renault, Boulogne-Billancourt, France

[21] Appl. No.: 79,921

[22] Filed: Sep. 28, 1979

[30] Foreign Application Priority Data

Sep. 29, 1978 [FR] France ................................ 78 27977

[51] Int. Cl.³ ............................................. G05D 16/10
[52] U.S. Cl. ...................................... 137/115; 137/509
[58] Field of Search ........................ 137/115, 494, 509

[56] References Cited

U.S. PATENT DOCUMENTS

| 2,890,715 | 6/1959 | Ebersold | 137/494 |
| 3,916,934 | 11/1975 | Koenig | 137/115 |

FOREIGN PATENT DOCUMENTS

| 1159231 | 6/1958 | France. | |
| 421843 | 11/1974 | U.S.S.R. | 137/509 |

Primary Examiner—Robert G. Nilson
Attorney, Agent, or Firm—Owen, Wickersham & Erickson

[57] ABSTRACT

A multi-level pressure regulating valve for a hydraulic control circuit. It includes a three-level or four-level pressure regulating valve utilizing an intermediate chamber which is fed with fluid through two parallel ducts, each having its own throttling device.

13 Claims, 5 Drawing Figures

MULTI-LEVEL PRESSURE REGULATING VALVE

BACKGROUND OF THE INVENTION

This invention relates to a multi-level (three or four levels) pressure regulating valve utilizing an intermediate chamber, which is fed with fluid through two parallel ducts, each having its own throttling device.

Relatively simple devices are known which can give two pressure levels. These devices are equipped with an intermediate chamber in which the pressure of the hydraulic circuit may or may not act.

Other complicated devices are known which combine several valves in order to obtain three or four pressure levels.

It is an object of this invention to provide a pressure regulating valve device of a specially simple fabrication based on the teachings herein.

SUMMARY OF THE INVENTION

The three-level or four-level pressure regulating valve according to the invention comprises a body in which a central spool slides. This central spool has two shoulders to which are applied, on the one hand, a resilient means engaging the body and, on the other hand, a small piston. The spool shoulder on which the resilient means acts throttles the feed fluid on its other face between a chamber into which a feed duct opens and a chamber connected with a return-to-tank duct.

The end of the other shoulder of the spool on which the small piston acts is located in an intermediate chamber fed through two parallel ducts, each having its own throttling device. The small piston has one face engaged with the spool in the intermediate chamber and another face located in an end chamber in connection with the feed fluid. The spool is balanced under the action, on the one hand, of the spring and, on the other hand, of the feed fluid pressure, which acts on the small piston, and of the intermediate chamber pressure which acts on the spool shoulder.

In one preferred embodiment, the resilient means is a spring.

In another preferred embodiment, the throttling devices of the ducts feeding the intermediate chamber are force-fitted nozzles.

The three-level or four-level pressure regulating valve can advantageously be applied to a hydraulic circuit feeding a receiver in which the different pressure levels are reached by connecting either duct or both ducts feeding the intermediate chamber, either with the feed pressure, or with the tank.

The three- or four-level pressure regulating valve according to the invention has the advantage of obtaining up to four pressure levels by combining two throttling devices with the feed to an intermediate chamber of a unit comprising a spool, a small piston and a resilient means.

Other features and advantages of this invention will become apparent from the following description of a particular embodiment given as an example and not restricted thereto, with reference to the enclosed drawings in which:

DESCRIPTION OF SOME PREFERRED EMBODIMENTS

Figure 1:
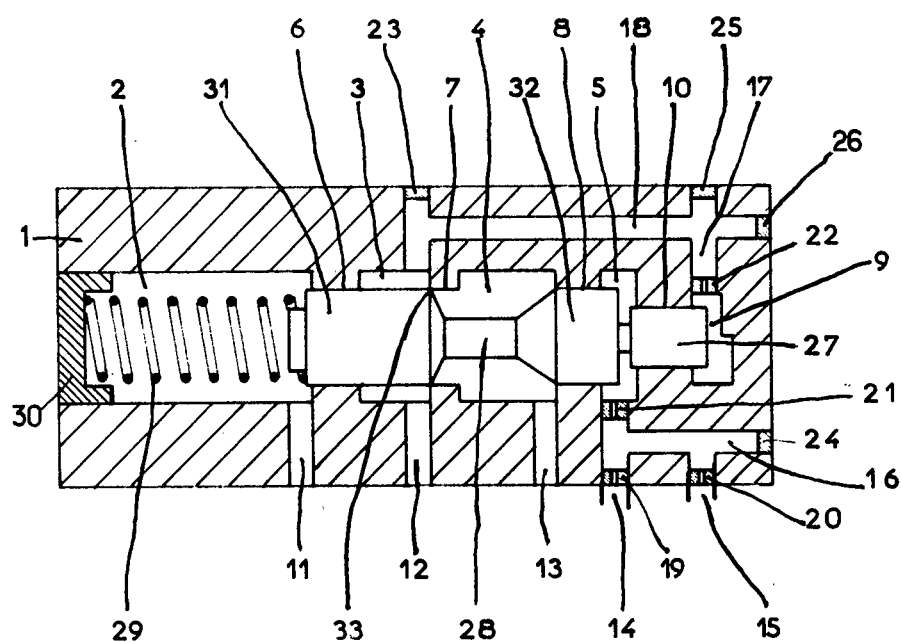
FIG. 1 is a view in longitudinal cross-section of a multi-level pressure regulating valve embodying the principles of the invention.

As shown in the longitudinal cross-section of FIG. 1, the multi-level pressure regulating valve comprises a body which has a large central bore extending to a small central bore. Four chambers 2, 3, 4, and 5 open into the large bore which thus has three bearing surfaces 6, 7, and 8. The chamber 5 and a chamber 9 open into the small bore, which thus has a bearing surface 10. The chamber 2 is connected with a duct 11. The chamber 3 may be called a feed chamber and is connected with a duct 12. The chamber 4 is connected with a duct 13. The chamber 5 is called an intermediate chamber and is connected with a duct 14.

A by-pass duct in two parts 15 and 16 is connected with the duct 14. The chamber 9 may be called an end chamber and is connected with the feed chamber 3 through ducts 17, 18, and 12. Nozzles 19 and 20 are located respectively at the inlet of the ducts 14 and 15. At the inlet of the chamber 5 is mounted a cushioning nozzle 21 and another cushioning nozzle 22 is mounted at the inlet of the chamber 9. The ducts 12, 16, 17, and 18 are sealed by plugs 23, 24, 25, and 26.

In the central bores are mounted, in succession, a small piston 27, a spool 28, a spring 29, and a plug 30.

The small piston 27 slides in the small bore on the bearing surface 10. The spool 28 slides in the large bore on the bearing surfaces 6 and 8 by means of its two shoulders 31 and 32. The spool 28, by moving, enlarges or reduces a throttling section 33 located between the feed chamber 3 and the chamber 4, which is connected with the tank through the duct 13. The chamber 2 is also connected with the tank through the duct 11.

Let:

$p_a$ = the feed pressure of the circuit,
$p_i$ = the pressure in the intermediate chamber,
$S$ = the sectional area of the spool,
$s$ = the sectional area of the small piston,
$R$ = the force of the spring.

The spool 28 is balanced under the action of the spring 29, on the one hand, and under the action of the feed and intermediate pressures, on the other hand: this balance is represented by the following equation:

$$p_a \times s + p_i \times (S-s) = R$$

$$\text{hence } p_a = \frac{R - p_i(S-s)}{s}$$

thus the feed pressure $p_a$ depends, on the one hand, upon the force of the spring 29 and the section areas S and s, which are construction data and, on the other hand, upon $p_i$.

Applications of the multi-level pressure regulating valve according to the invention are shown in FIGS. 2, 3, 4, and 5, and they will help to give a better understanding of its working.

Figure 2:
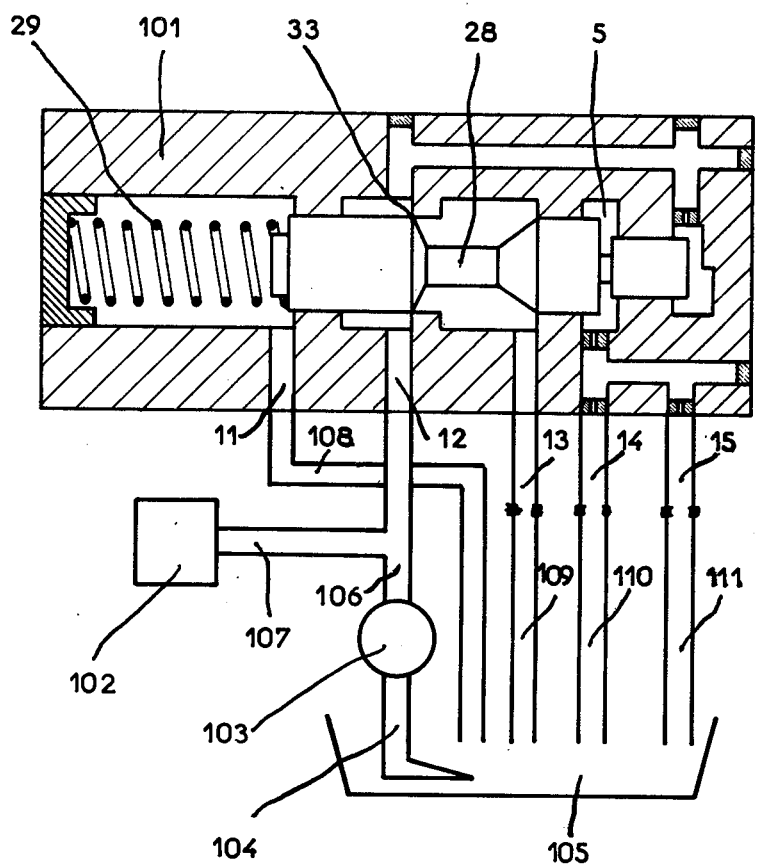
FIG. 2 is a similar view showing the pressure regulating valve of FIG. 1 to control the hydraulic circuit of a receiver, both intermediate chamber feed ducts being connected with the tank.

In FIG. 2, a four-level pressure regulating valve 101, as described above, is connected with a hydraulic circuit feeding a receiver 102. This circuit comprises a pump 103 which sucks oil through a pipe 104 into a reservoir or tank 105. The pump discharges oil into the pipes 106 and 107. The receiver 102 is connected with the pipe 107 and the valve 101 is connected with the pipe 106 through its duct 12. The ducts 11 and 13 of the valve 101 are respectively connected with the tank 105 through the pipes 108 and 109. The ducts 14 and 15 of the valve 101 are also connected with the tank through the respective pipes 110 and 111. The pressure in the intermediate chamber 5 is zero since it is connected with the tank 105 by the duct 14 and pipe 110. The equilibrium of the spool 28 is represented by the following equation:

$$p_a \times s = R$$

hence $$p_a = R/s$$

The first pressure level, which is the highest level, is thus obtained in the receiver feed circuit. When the feed pressure drops below this level, the action on the spool 28 due to the pressure decreases, and the spring 29 pushes the spool 28 back, which decreases the throttling section 33 of the return-to-tank duct and restores the pressure to its initial level.

Figure 3:
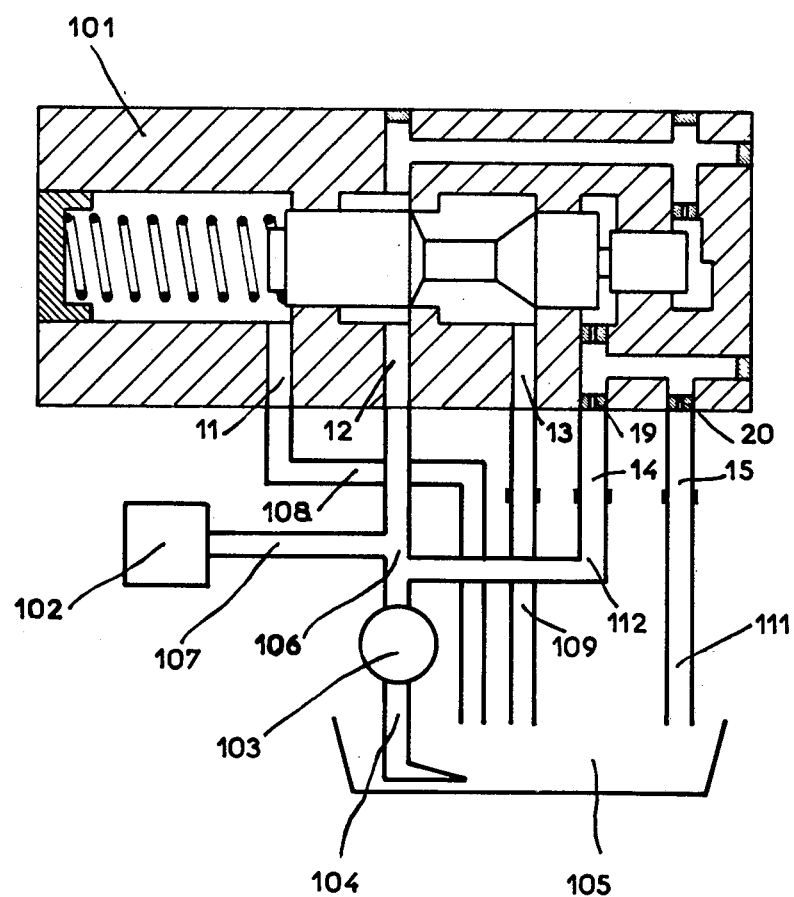
FIG. 3 is a view similar to FIG. 2 with one of the intermediate chamber ducts being connected with the feed circuit and the other duct being connected with the tank.

FIG. 3 shows the pressure regulating valve 101 connected with another hydraulic circuit feeding the receiver 102. This circuit comprises a portion identical with the circuit in FIG. 2, with the tank 105, the pump 103, the receiver 102, the valve 101, and the pipes 104, 106, and 107. The valve 101 is connected with the pipe 106 through its duct 12. The ducts 11 and 13 of the valve 101 are respectively connected with the tank through the pipes 108 and 109. The duct 14 of the valve 101 is connected with the feed circuit through a pipe 112. The duct 15 is connected with the tank through a pipe 111. The nozzle 19 has a cross-section "a" smaller than the cross-section "b" of the nozzle 20. The flow rate $Q_3$ through these two nozzles being the same, we have the equation:

$$Q_3 = k \cdot a \sqrt{p_a - p_i} = k \cdot b \sqrt{p_i}$$

(both nozzles being considered as having a sharp-edged orifice) where k=discharge coefficient, hence:

$$p_i = p_a \times \frac{a^2}{a^2 + b^2}$$

The equilibrium of the spool 28 is represented by the following equation:

$$p_a \times s + p_i \times (S - s) = R$$
$$p_a \times s + p_a \frac{a^2}{a^2 + b^2} (S - s) = R$$

$$p_a = \frac{R}{s + \frac{a^2}{a^2 + b^2}(S - s)}$$

The receiver feed circuit in FIG. 3 thus has a second pressure level which is less in value than the first level of the circuit in FIG. 2.

Figure 4:
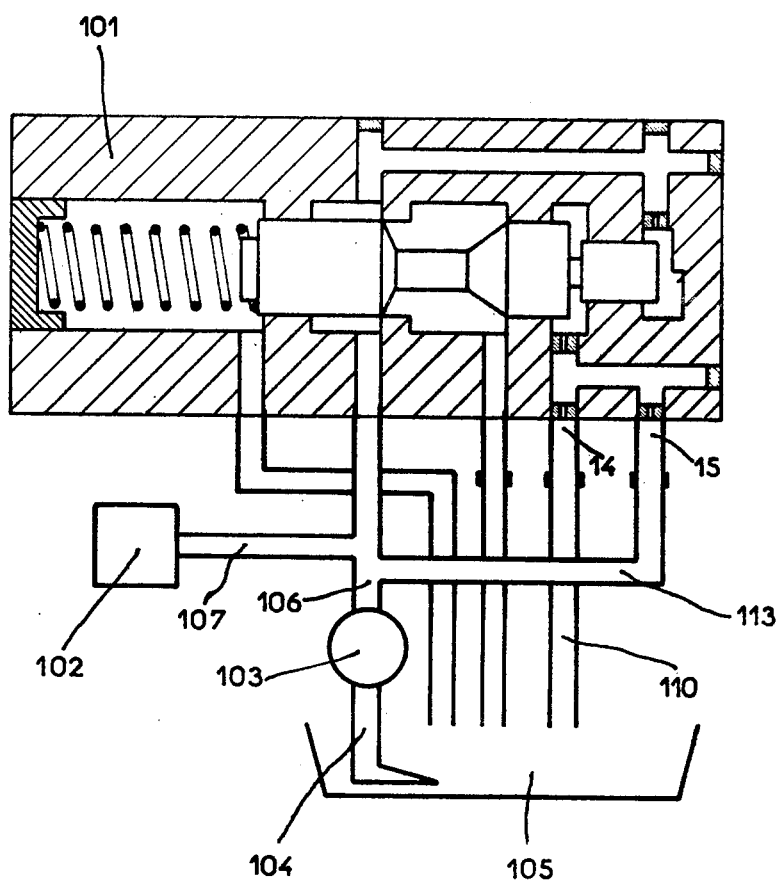
FIG. 4 is a view similar to FIG. 3 with the intermediate chamber feed duct which was connected with the feed circuit in FIG. 3 being connected with the tank and the other duct being connected with the feed circuit.

FIG. 4 shows the pressure regulating valve 101 again connected with a hydraulic circuit feeding the receiver 102. This circuit comprises a portion identical with the circuit in FIG. 2 with the tank 105, the pump 103, the receiver 102, the valve 101, and the pipes 104, 106, and 107. The duct 14 of the valve 101 is connected with the tank through the pipe 110. The duct 15 of the valve 101 is connected with the feed circuit through a pipe 113.

The flow rate through these two nozzles being the same, we have the equation:

$$Q_4 = k \cdot b \sqrt{p_a - p_i} = k \cdot a \sqrt{p_i}$$

hence $p_i = p_a \times \frac{b^2}{a^2 + b^2}$

The equilibrium of the spool 28 is represented by the following equation:

$$p_a \times s + p_i \times (S - s) = R$$
$$p_a \times s + p_a \frac{b^2}{a^2 + b^2} (s - s) = R$$
$$p_a = \frac{R}{s + \frac{b^2}{a^2 + b^2}(S - s)}$$

Since $a < b$, the pressure, $p_a$, in FIG. 4 is smaller than the pressure, $p_a$, in FIG. 3. The receiver feed circuit has a third pressure level which is less in value than the second level of the circuit in FIG. 3.

Figure 5:
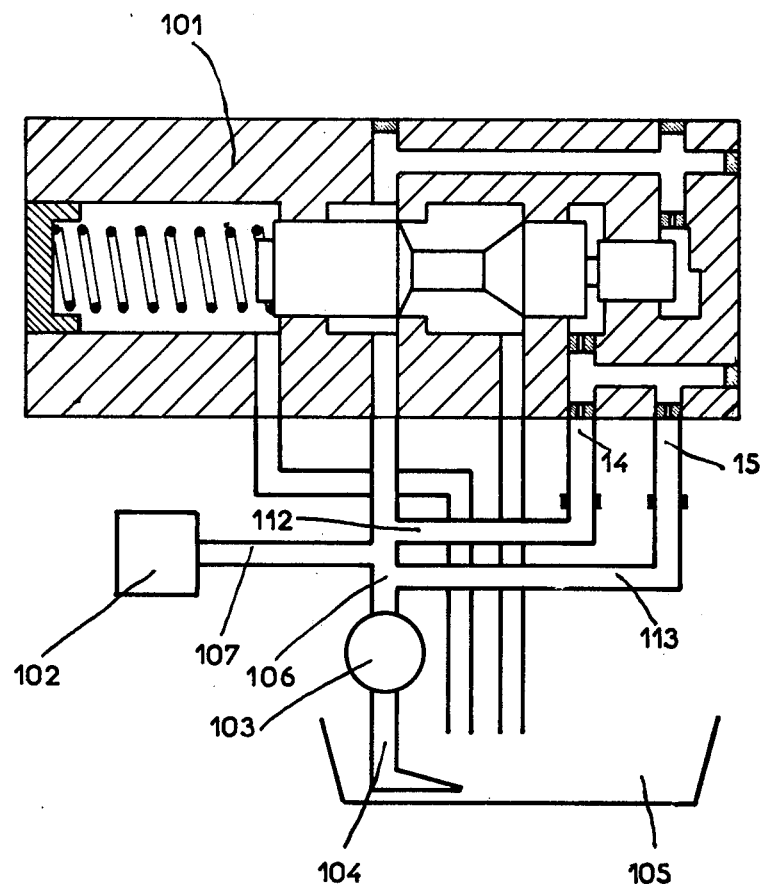
FIG. 5 is a view similar to FIG. 2 with both intermediate chamber feed ducts being connected with the feed circuit.

FIG. 5 shows the pressure regulating valve 101 connected with another hydraulic circuit feeding the receiver 102. This circuit comprises a portion identical with the circuit in FIG. 2 with the tank 105, the pump 103, the receiver 102, the valve 101, and the pipes 104, 106, and 107. The ducts 14 and 15 of the valve 101 are respectively connected with the feed circuit through the pipes 112 and 113. The pressure in the intermediate chamber 5 is the same as the feed pressure $p_a = p_a$.

The equilibrium of the spool 28 is represented by the following equation:

$$p_a \times s + p_i \times (S-s) = R$$
$$p_a \times s + p_a \times (S-s) = R$$

$$p_a = \frac{R}{s + (S - s)}$$

since $\frac{a^2}{a^2 + b^2} < \frac{b^2}{a^2 + b^2} < 1$ the pressure, $p_a$, in FIG. 5 is smaller than the pressure, $p_a$, in FIG. 4. The receiver feed circuit thus has a fourth pressure level which is less in value than the third level of the circuit in FIG. 4. It should be noted that in FIGS. 2, 3, 4, and 5, as the movement of the spool 28 is comparatively small, the force R may be (and is here) considered as comparatively constant.

If the nozzles 19 and 20 had identical cross-sections a and b, the pressure levels of the circuits in FIGS. 3 and 4 would be identical and the pressure regulating valve would be a three-level one.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A multilevel pressure regulating valve for a hydraulic control circuit, comprising
    a valve body having a first end chamber and a second end chamber, a feed chamber connected by a conduit to said second end chamber, and an intermediate chamber,
    a reservoir for hydraulic fluid,
    feed means for feeding fluid from said reservoir to said feed chamber,
    a central spool slidably mounted in said body,
    resilient means in said first end chamber compressed between said body and one end of said spool first urging said spool to a position throttling the feed fluid exiting from said feed chamber and for returning some of said fluid to a said reservoir,
    a small piston in said second end chamber of said body acting on the other end of said spool, and
    two parallel ducts, each having its own throttling nozzle, connecting said intermediate chamber to said reservoir.

2. A multilivel pressure regulating valve for a hydraulic control circuit having a tank for hydraulic fluid, comprising
    a valve body, having a main bore joined at one end to a smaller bore in line therewith, a first end chamber at the opposite end of said main bore from said smaller bore, and a second end chamber at the opposite end of said smaller bore from said main bore,
    said body also providing around said main bore a feed chamber, an intermediate chamber, and a return-to-tank chamber between said feed chamber and said intermediate chamber,
    said body also having a conduit connecting said feed chamber to said second end chamber through a restricted nozzle, return ducts to said tank leading out from each of said first end chamber and said return-to-tank chamber, and two parallel ducts, each having its own throttling nozzle, connected to said intermediate chamber,
    feed means for feeding fluid from said tank to said feed chamber,
    a central spool having first and second shoulders facing in opposite directions slidably mounted in said main bore of said body with a narrow portion in between said shoulders, said first shoulder having a first face facing said first end chamber and a second face in a position facing said narrow portion, said second shoulder having a first face facing said second end chamber and a second face facing said narrow portion and said return-to-tank chamber,
    resilient means in said first end chamber compressed between said body and said first face of said first shoulder and causing said first shoulder and its second face to throttle the feed fluid flowing from said feed chamber into said return-to-tank chamber from which the fluid is thereby returned to the tank, and
    a small piston in said second end chamber of said body engaging said first face of said second shoulder.

3. A multilevel pressure regulating valve for a hydraulic control circuit having a reservoir for hydraulic fluid, comprising
    a valve body having a first end chamber and a second end chamber, a feed chamber having an inlet duct and connected by a conduit to said second end chamber; an intermediate chamber, and a return passage between said feed chamber and said intermediate chamber,
    a central spool slidably mounted in said body,
    resilient means in said first end chamber compressed between said body and one end of said first spool first urging said spool to a position throttling the feed fluid exiting from said feed chamber and for diverting some of said fluid to said return passage,
    a small piston in said end chamber of said body acting on the other end of said spool, and
    two parallel ducts, each having its own throttling nozzle, leading out from said intermediate chamber.

4. A multilevel pressure regulating valve for a hydraulic control circuit having a tank, comprising
    a valve body, having a main bore joined at one end to a smaller bore in line therewith, a first end chamber at the opposite end of said main bore from said smaller bore, and a second end chamber at the opposite end of said smaller bore from said main bore,
    said body also providing around said main bore, a feed chamber with an inlet duct, an intermediate chamber, and a return-to-tank chamber between said feed chamber and said intermediate chamber,
    said body also having a conduit connecting said feed chamber to said second end chamber through a restricted nozzle, return ducts leading out from each of said first end chamber and said return-to-tank chamber, and two parallel ducts, each having its own throttling nozzle, connected to said intermediate chamber,
    a central spool having first and second shoulders facing in opposite directions slidably mounted in said main bore of said body with a narrow portion in between said shoulders, said first shoulder having a first face facing said first end chamber and a second face in a position facing said narrow portion, said second shoulder having a first face facing said second end chamber and a second face facing said return-to-tank chamber,
    resilient means in said first end chamber compressed between said body and said first face of said first shoulder and causing said first shoulder and its second face to throttle fluid flowing from said feed chamber to said return-to-tank chamber, thereby to send some of the fluid into said return-to-tank chamber, and
    a small piston in said second end chamber of said body engaging said first face of said second shoulder.

5. The valve according to any of claims 1, 2, 3, or 4, wherein the resilient means is a spring.

6. The valve according to any of claims 1, 2, 3, or 4, wherein the throttling devices of the parallel ducts for the intermediate chamber are force-fitted nozzles.

7. The valve according to any of claims 1, 2, 3, or 4, wherein the intermediate chamber is connected to its parallel ducts by a cushioning nozzle.

8. The valve according to any one of claims 1, 2, 3, or 4, wherein the conduit connecting the feed chamber to the end chamber contains a cushioning nozzle.

9. The valve according to any one of claims 1, 2, 3, or 4 wherein the throttling devices of the parallel feed ducts are identical.

10. A hydraulic control circuit, comprising
    a valve body having a first end chamber and a second end chamber, a feed chamber connected by a conduit to said second end chamber, and an intermediate chamber,
    a hydraulic receiver,
    a reservoir for hydraulic fluid,
    feed means for feeding fluid from said reservoir to said feed chamber and to said hydraulic receiver,
    a central spool slidably mounted in said body,
    resilient means in said first end chamber compressed between said body and one end of said spool first urging said spool to a position throttling the feed fluid exiting from said feed chamber and for returning some of said fluid to a said reservoir,
    a small piston in said end chamber of said body acting on the other end of said spool, and
    two parallel ducts, each having its own throttling nozzle, connecting said intermediate chamber to said reservoir.

11. The control circuit of claim 10 wherein both said parallel ducts are connected to the reservoir, thereby providing a first feed pressure level.

12. The control circuit of claim 10 wherein one of the two parallel ducts is connected with the feed means thereby providing a different feed pressure level, the value of which depends on which said duct is so connected.

13. A hydraulic control circuit, comprising
    a valve body having a first end chamber and a second end chamber, a feed chamber connected by a conduit to said second end chamber, and an intermediate chamber,
    a hydraulic receiver,
    a reservoir for hydraulic fluid,
    feed means for feeding fluid from said reservoir to said feed chamber and to said hydraulic receiver,
    a central spool slidably mounted in said body,
    resilient means in said first end chamber compressed between said body and one end of said spool for urging said spool to a position throttling the feed fluid exiting from said feed chamber and for returning some of said fluid to a said reservoir,
    a small piston in said end chamber of said body acting on the other end of said spool, and
    two parallel ducts, each having its own throttling nozzle, both connecting said intermediate chamber to said receiver.

* * * * *